W. A. BARKER, DEC'D.
R. B. FERREBY, ADMINISTRATOR.
CHUCK.
APPLICATION FILED OCT. 6, 1921.

1,429,396.

Patented Sept. 19, 1922.
2 SHEETS—SHEET 1.

Witness:
A. J. Sauser

Inventor:
Wendell A. Barker,
deceased,
Rolla B. Ferreby, Adm'r,
By Samuel N. Pond, Atty.

Inventor:
Wendell A. Barker,
deceased,
Rolla B. Ferreby, Adm'r,
By Samuel N. Pond Atty.

Witness:
A. J. Sauser.

Patented Sept. 19, 1922.

1,429,396

UNITED STATES PATENT OFFICE.

WENDELL A. BARKER, DECEASED, LATE OF ELKHART, INDIANA, BY ROLLA BARKER FERREBY, ADMINISTRATOR, OF ELKHART, INDIANA.

CHUCK.

Application filed October 6, 1921. Serial No. 505,793.

*To all whom it may concern:*

Be it known that WENDELL A. BARKER, deceased, late a citizen of the United States, residing at Elkhart, in the county of Elkhart and State of Indiana, did invent certain new and useful Improvements in Chucks, of which the following is a specification.

This invention relates to chucks adapted to be used on lathes and similar machine tools, and has reference to an improved mechanism for actuating the work actuating jaws into, and hold them in, gripping relation to the work.

The present invention is based upon a type of chuck disclosed in Letters Patent to Wendell A. Barker, No. 1,249,300, December 11, 1917 and No. 1,389,731, September 6, 1921, this type being characterized by the employment of jaw actuating levers mounted in the chuck body and actuated by rotary cams mounted on and concentric with the hub of the chuck body, and a planetary gear transmission between the hub and the cams by which the latter, when the chuck is revolving, are maintained relatively stationary to the chuck body, and a manually operated device by the actuation of which a relative movement of the cams to the chuck body so as to actuate the jaw actuating levers can be effected, either when the chuck is idle or when it is rotating.

It will be readily understood that a chuck must be capable of exerting very great pressure on the jaws in order to firmly hold the work being machined against the tearing out tendency of the cutting tools. Yet sufficient jaw movement must be allowed for in order to completely clear the work when it is being put into the jaws or taken out, and in many cases the jaws must clear a shoulder or irregularity that is much larger in diameter than the surface to be gripped.

In the chucks disclosed in the aforesaid patents this was taken care of by making the cams with two inclines, the initial incline being relatively abrupt and intended to give a large approach movement to the jaws, and the second incline being at a much lower angle to afford slight additional movement together with the gripping pressure. This additional movement in practice has been fixed at one-eighth inch on the diameter, and in most cases was ample to provide for whatever variations occurred in a run of castings, drop forgings or other duplicate parts. But there are some parts, such as hand hammered forgings, for which this gripping allowance is insufficient, and it is not practical to increase the gripping allowance either by changing the angle on the cam or by decreasing the lever ratio, as this would decrease the gripping power, whereas an increased gripping power was found to be very desirable. These limitations of the chucks of the aforesaid patents gave rise to the improvement embodied in the present invention.

According to the present invention, instead of employing for each lever an abrupt cam and a low cam continuous with and stationary relatively to the abrupt cam, there are employed two relatively movable cams, to-wit—a relatively abrupt cam articulated to the lever close to the trunnion of the latter for effecting the approach and withdrawal movements of the jaws, and a relatively low long cam articulated to the lever at a greater distance from the trunnion and effecting the gripping and release movements of the jaws. The rings carrying the two cams are both revolvably mounted on the hub of the chuck and are capable of revolving relatively to each other and to the chuck body. The ring carrying the low cams is normally driven at the same speed and in the same direction as the chuck body through a planetary gear transmission similar to that disclosed in the aforesaid patents, and the other cam ring carrying the abrupt cams is yieldably connected to said first named cam ring preferably by a friction brake mechanism, so that it also is caused to revolve with the chuck body in the same direction and at the same speed. By means of a ring gear actuated by a hand lever and operating through the planetary transmission, a simultaneous rotation of both cam rings relatively to the chuck body is set up, by which the jaws are brought into engagement with the work, and then by a further movement of the lever in the same direction, the friction between the two cam rings is overcome, and the cam ring carrying the low cams is caused to revolve to a further extent in the same direction and, through the jaw actuating levers, effects a powerful gripping of the jaws on the work.

The invention, its novel structural features, mode of operation, and advantages will be readily understood by persons skilled in the art from the following detailed description taken in connection with the accompanying drawings, wherein I have illustrated a simple, practical and operative embodiment of the principle of the invention, and in which—

Figure 3:
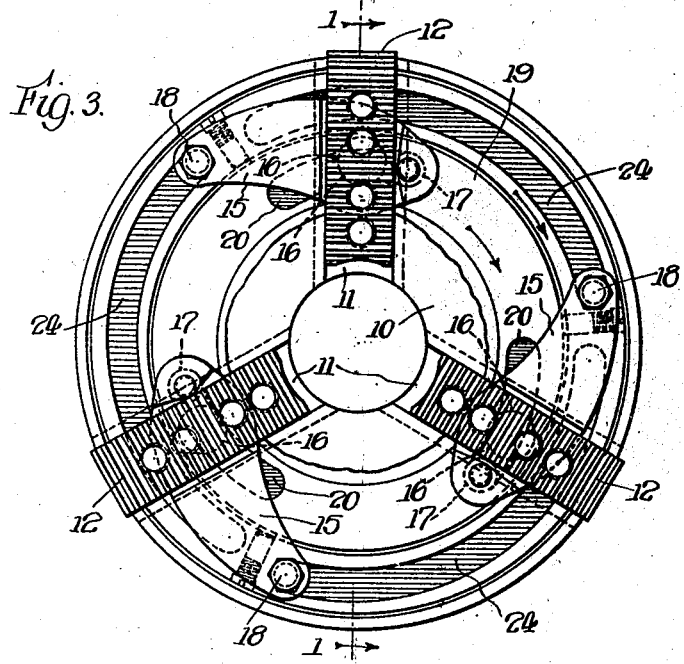
Fig. 3 is a transverse sectional view taken on the line 3—3 of Fig. 1; parts of the face of the chuck being broken away.

Referring to the drawings, reference character 10 designates the hollow hub of a chuck body which is designed to be mounted upon the spindle (not shown) of a lathe or like machine in a manner well understood. In a series of radially arranged grooves 11 formed in the front face of the chuck body are mounted a plurality (herein shown as three) of work holding jaws each comprising a jaw base 12 and jaw proper 13, and fastening and adjusting bolts 14 for adjustably securing the jaw members 13 to their bases 12. The inner sides of the jaws and adjacent portions of the chuck head are hollowed out to receive a group of jaw actuating levers 15 that are fulcrumed near one end to the jaw bases 12 by round trunnions 16 on the latter. The short arm of each lever 15 carries a cam follower in the form of a roller 17, while the long arm of each lever carries a similar cam follower 18. Sleeved on the hub 10 of the chuck is a cam ring 19 in the face of which are formed three cam grooves or slots 20 (Fig. 3), the walls of which have a comparatively steep or abrupt eccentricity relatively to the axis of the chuck. These abrupt cam grooves 20 are engaged by the cam followers 17. Also sleeved on the hub 10 of the chuck, in rear of the cam ring 19, is the hub 21 of a disc 22 that carries a forwardly projecting cam ring 23 encircling the cam ring 19. This cam ring 23 has formed in its face a group of three cam grooves or channels 24, of considerably greater length than the grooves or channels 21 and formed with inclined walls of relatively slight and gradual eccentricity relatively to the axis of the chuck. The cam grooves 24 are engaged by the followers 18 on the longer arms of the cam levers. In the cam ring 23 are formed a plurality of radial sockets 25 opening through the inner periphery of the ring, in each of which is a plug 26 provided with a friction face 26' that is pressed against the outer periphery of the inner cam ring 19 by a compression spring 27.

Figure 4:
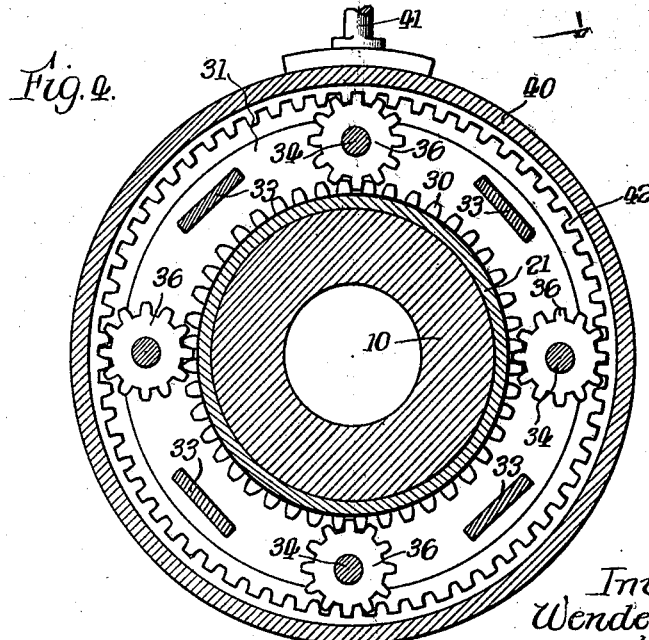
Fig. 4 is a transverse sectional view taken on the line 4—4 of Fig. 1.

Describing next the mechanism for normally rotating the two cam rings simultaneously and equally with the chuck body, and for producing relative movement of said cam rings and the chuck body when chucking and unchucking the work, keyed on the hub 10 is the hub 28 of a ring gear 29, and on the hub 21 of the outer cam ring 23 is a similar ring gear 30 of the same size and number of teeth as the gear 29. Encircling the hub of the chuck and bearing on the hubs 21 and 28 is rotatably mounted a gear cage comprising a pair of rings 31 and 32 integrally spaced and connected by cross bars 33 (Fig. 4). In this gear cage are mounted on pins 34, four pairs of planet gears, each pair consisting of a gear 35 meshing with the ring gear 29 and a gear 36 meshing with the ring gear 30, said gears 35 and 36 being of the same size and number of teeth and independently journaled side by side on the bearing pin 34. 37 designates a stationary annular rear wall that is suitably attached to the frame of the lathe and is provided with a forwardly extending flange 38 on which is formed an internal gear 39 encircling and meshing with the group of planet gears 35. Also mounted with capacity for turning movement on the flange 38 and on the outer periphery of the cage ring 32 is a ring 40 provided on its upper side with a radially projecting handle 41 (Fig. 4) by which said ring can be manually turned in either direction. On the inner periphery of the ring 40 is an internal gear 42 of the same size and number of teeth as the internal gear 39, said internal gear 42 encircling and meshing with the group of planet gears 36. An annular clamping nut or ring 43 is threaded onto the rear end of the chuck hub 10 to lock the gear cage on the hub and otherwise assist in uniting the parts and steadying the structure.

Assuming that the chuck is rotating, by reason of the meshing relation of the planet gears 35 with the rotating gear 29 and the stationary internal ring gear 39, the gear cage is urged in the same direction as the chuck but at a slower speed. As the gear cage rotates, carrying with it the planet gears 36, each of which meshes with the gear 30 of the outer cam ring 23 and the stationary internal gear 42 (the handle 41 being locked), the cam ring 23 is rotated in the same direction and at the same speed as the chuck body, and through the friction brakes 26, carries with it the inner cam ring 19. Since the jaw operating levers 15 are carried by the chuck body, and both cam rings are rotating in the same direction and at the same speed as the chuck body, it is manifest that no relative movement between the cam rings and the levers takes place, and consequently the jaws remain stationary relatively to the chuck body.

Figure 1:
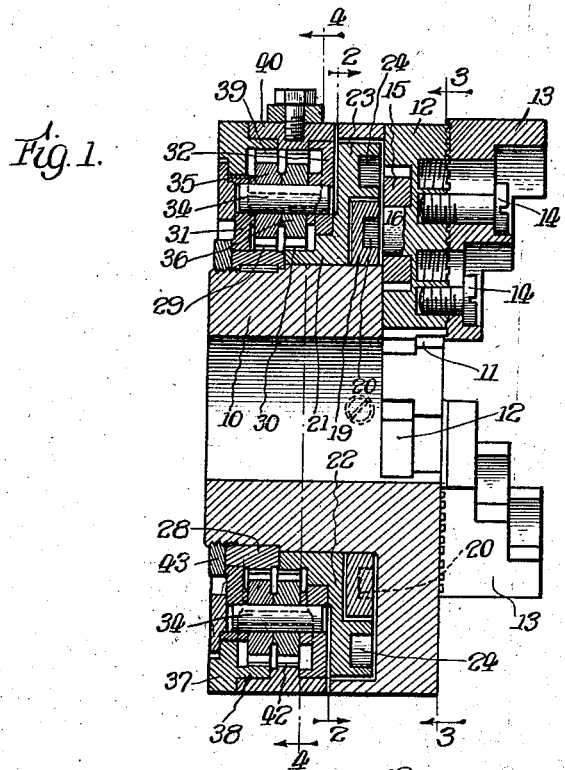
Fig. 1 is a central longitudinal sectional view through a chuck embodying the invention taken on the line 1—1 of Fig. 3.
Figure 2:
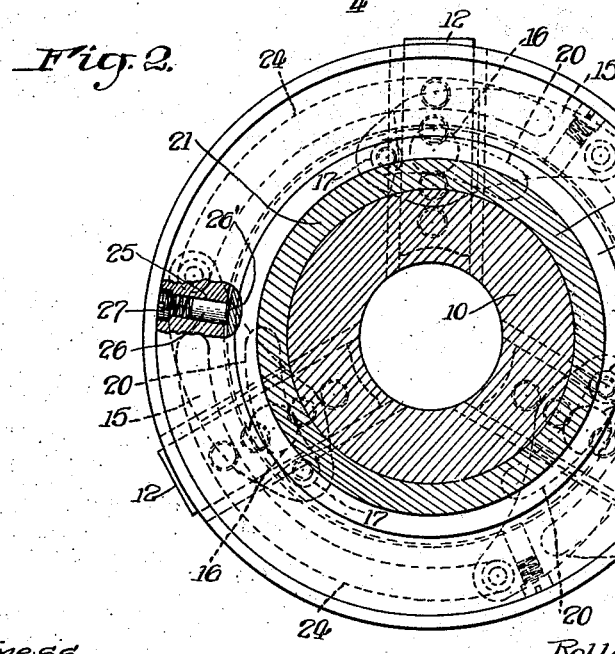
Fig. 2 is a transverse sectional view on the line 2—2 of Fig. 1.

Assuming now that the chuck is idle and that it is desired to close the jaws upon a piece of work. The handle 41 is swung by the operator in a counter-clockwise direction, viewing Fig. 4, or toward the observer viewing Fig. 1, carrying with it the movable internal gear 42. At this time the cage carrying the planet gears is locked against rotation by the engagement of the rear planet gears 35 with both the outer and inner internal gears 39 and 29 which are stationary. This causes a rotation of the front planet gears 36 on their own axes in a counter-clockwise direction, viewing Fig. 4, thus imparting to the outer cam ring 23 a rotation in a clockwise direction, and the inner cam ring 19 also rotates in the same direction, being frictionally connected to the outer cam ring and dragged along by the latter. This simultaneous movement of the two cam rings continues until the cams 20 have moved the jaws into engagement with the work. When this has occurred the inner cam ring 19 cannot move any further, and the further swing of the hand lever in the same direction causes a further movement of the outer cam ring, the frictional grip of the brakes being overcome, and the long low cams 24, acting through the long arms of the levers effect a very powerful gripping of the jaws on the work.

Precisely the same relative movements of the parts take place when the chuck is rotating as occur when it is stationary, so that, as in the prior patents above referred to, the work can be chucked and unchucked equally well when the chuck is rotating and when it is stationary.

Among the advantages of the present construction over the constructions disclosed in the patents aforesaid may be mentioned: first, the total jaw movement is greater than the total jaw movement of the two portions of the cam afforded by the old construction, thereby giving the jaws greater clearance from the work when in the open position; second, a gripping pressure is obtained during any part of this movement thereby giving a gripping variation many times that obtainable with the single cam construction, so that pieces of work varying considerably in size can be chucked without readjusting the jaws; third, since very little additional movement is required after the movement cam has brought the jaws to the work, the gripping cam can be made with very low angled grooves which, together with the long leverage of the trunnion lever, results in very great jaw pressure; fourth, by engaging both ends of the trunnion levers in the cam grooves, respectively, the leverage ratios can easily be changed to suit special conditions much more readily than in the former construction; and fifth, the considerably longer jaw movement obtainable with the present construction reduces the necessity of adjusting the positions of the jaws on their bases for the handling of work of varying diameters.

In a companion application filed simultaneously herewith, Serial No. 505,792, I have disclosed a mechanism embodying the same broad principle of operation that underlies the mechanism herein shown and described. In the said companion application, I have shown the outer ring which carries the low cams frictionally engaged with the body of the chuck, and transmitting rotation to the inner cam ring through the planetary gear transmission. In that case the two cam rings move successively and in opposite directions, whereas in the present case the two cam rings move in the same direction and simultaneously to the extent of the movement of the inner cam ring, thereby necessitating somewhat longer cam grooves in the outer cam ring. In the aforesaid companion application I have made claims generic to the structures of both applications. The structure of the present application is somewhat simpler and to that extent less costly to manufacture; but both structures are believed to be equally efficient to accomplish the stated purposes of the invention.

What is claimed, and desired to be secured by Letters Patent, is:

1. In a chuck, the combination of a rotatable chuck body, jaws movable radially therein, levers pivoted between their ends to said jaws respectively, cam means coaxial with said body and normally rotating at the same speed and in the same direction as the latter and operatively engaged with one arm of each of said levers, other cam means coaxial with said body and normally rotating at the same speed and in the same direction as the latter and operatively engaged with the other arm of each of said levers, and means for effecting simultaneous rotation of both said cam means relatively to said body and then a rotation of one of said cam means relatively to the other.

2. In a chuck, the combination of a rotatable chuck body, jaws movable radially therein, levers pivoted between their ends to said jaws respectively, cam means coaxial with said body and normally rotating at the same speed and in the same direction as the latter and operatively engaged with one arm of each of said levers, other cam means coaxial with said body and normally rotating at the same speed and in the same direction as the latter and operatively engaged with the other arm of each of said levers, and means for effecting simultaneous and equal rotation in the same direction of both said cam means relatively to said body and then a further rotation in the same direction of one of said cam means relatively to the other.

3. In a chuck, the combination of a rotatable chuck body, jaws movable radially therein, levers pivoted to said jaws and each having relatively short and long arms, cam means coaxial with said body and normally rotating at the same speed and in the same direction as the latter and operatively engaged with the short arms of said levers, other cam means coaxial with said body and normally rotating at the same speed and in the same direction as the latter and operatively engaged with the long arms of said levers, and means for effecting simultaneous and equal rotation in the same direction of both said cam means relatively to said body and then a further rotation in the same direction of the cam means engaged with the long arms of said levers relatively to the other cam means.

4. In a chuck, the combination of a rotatable chuck body, jaws movable radially therein, levers pivoted between their ends to said jaws respectively, a cam ring coaxial with said body and normally rotating at the same speed and in the same direction as the latter and formed with relatively steep cams operatively engaged with one arm of each of said levers, a second cam ring coaxial with said body and normally rotating at the same speed and in the same direction as the latter and formed with relatively long low cams operatively engaged with the other arm of each of said levers, and means for effecting simultaneous rotation of both said cam rings relatively to said body and then a relative rotation of said second cam ring relatively to the other cam ring.

5. In a chuck, the combination of a rotatable chuck body, jaws movable radially therein, levers pivoted to said jaws and each having relatively short and long arms, a cam ring coaxial with said body and normally rotating at the same speed and in the same direction as the latter and formed with relatively steep cams operatively engaged with the short arms of said levers, a second cam ring coaxial with said body and normally rotating at the same speed and in the same direction as the latter and formed with relatively long low cams operatively engaged with the long arms of said levers, and means for effecting simultaneous and equal rotation in the same direction of both said cam rings relatively to said body and then a further rotation in the same direction of said second cam ring relatively to the other cam ring.

6. In a chuck, the combination of a rotatable chuck body, jaws movable radially therein, levers pivoted between their ends to said jaws respectively, a pair of cam rings coaxial with said body and carrying cams operatively engaged with the respective arms of said levers, a brake yieldably connecting said cam rings to each other, a planetary gear transmission from said body to one of said cam rings whereby both rings normally rotate at the same speed and in the same direction as said body, and means operating through said planetary gear transmission to effect simultaneous movement of said cam rings and then a further movement of one of said cam rings relatively to the other.

7. In a chuck, the combination of a rotatable chuck body, jaws movable radially therein, levers pivoted between their ends to said jaws respectively, inner and outer cam rings coaxial with said body and formed with cams operatively engaged with the respective arms of said levers, a brake yieldably connecting said cam rings to each other, a planetary gear transmission from said body to said outer cam ring whereby both rings normally rotate at the same speed and in the same direction as said body, and means operating through said planetary gear transmission to effect simultaneous and equal rotation in the same direction of both said cam rings relatively to said body and then a further rotation in the same direction of said outer cam ring relatively to said inner cam ring.

8. In a chuck, the combination of a rotatable chuck body, jaws movable radially therein, levers pivoted between their ends to said jaws respectively, a cam ring coaxial with said body and formed with cams operatively engaged with one arm of each of said levers, a second cam ring encircling said first-named cam ring and formed with cams operatively engaged with the other arm of each of said levers, spring pressed brake shoes mounted in the periphery of one of said rings and bearing on the periphery of the other to yieldably couple said rings, a planetary gear transmission from said body to said second cam ring whereby both rings normally rotate at the same speed and in the same direction as said body, and means operating through said planetary gear transmission to effect simultaneous and equal rotation in the same direction of both said cam rings relatively to said body and then a further rotation in the same direction of said second cam ring relatively to said first-named cam ring.

ROLLA BARKER FERREBY,
*Administrator of the Estate of Wendell A. Barker, deceased.*